Jan. 22, 1952   F. T. HARRINGTON   2,583,296
FLOW REGULATING VALVE
Filed June 18, 1945                        2 SHEETS—SHEET 1
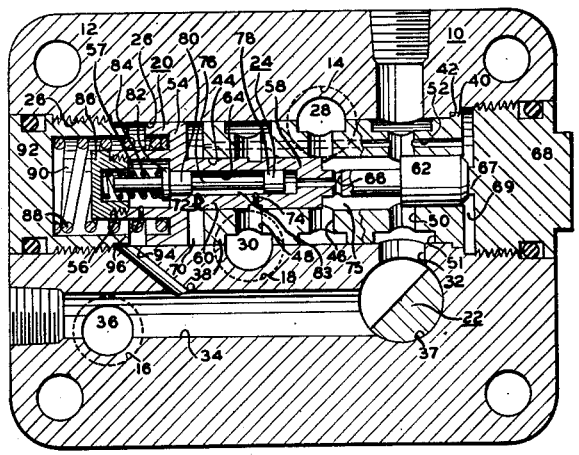
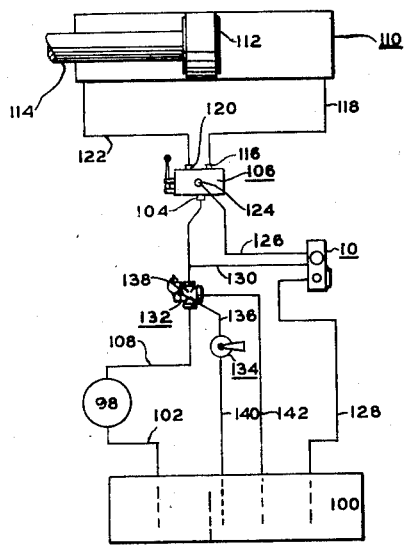
INVENTOR.
FERRIS T. HARRINGTON
BY
ATTORNEY Jan. 22, 1952  F. T. HARRINGTON  2,583,296
FLOW REGULATING VALVE
Filed June 18, 1945  2 SHEETS—SHEET 2

INVENTOR.
FERRIS T. HARRINGTON

BY
Ralph L. Tweedale
ATTORNEY

Patented Jan. 22, 1952

2,583,296

UNITED STATES PATENT OFFICE 2,583,296

FLOW REGULATING VALVE

Ferris T. Harrington, Detroit, Mich., assignor to Vickers Incorporated, Detroit, Mich., a corporation of Michigan Application June 18, 1945, Serial No. 600,002

6 Claims. (Cl. 60—52)

This invention relates to power transmissions, particularly to those of the type comprising two or more fluid pressure energy translating devices, one of which may function as a pump and another as a fluid motor.

In particular, the invention relates to an improvement in a flow-regulating valve comprising an adjustable throttle and a compensating valve for maintaining a constant flow across the throttle through which fluid is adapted to flow at a regulated rate.

Flow-regulating valves have an important use in hydraulic power transmissions for driving machine tools. They serve the purpose of producing a reduced speed rate of the machine tool which may be driven by the fluid motor at a constant regulated rate of speed regardless of load resistance.

In the past in hydraulic transmissions containing a fluid motor used for the purpose of driving a machine tool and a flow-regulating valve to regulate the speed of the motor, some difficulty was presented in preventing motor jump when the motor was started after interruption and, in particular, when the machine tool slide connected to the motor was moved into a feed position from rest or where there was a resumption of a feed movement after interruption during a slide movement. If the operator of a machine tool forgot to back the tool away from the work before resuming a cut after a feed movement was interrupted, the tool was damaged because of this motor jump. This is due to the fact that, when flow through the flow-regulating valve is interrupted, the compensating valve is held to the fully open position by a compensating valve spring. When flow is resumed through the flow-regulating valve after interruption, a temporary flow of fluid above the amount the flow-regulating valve ordinarily would permit, passes through the fully open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins.

In the past this difficulty has been avoided by the addition of valves incorporated in the transmission to induce a flow through the flow-regulating valve or by means external to the flow-regulating valve to close the compensating valve when flow through the flow-regulating valve was interrupted.

It is an object of this invention to provide an improvement in a flow-regulating valve containing an adjustable throttle and compensating valve which will prevent a flow of fluid above the normal regulated rate when flow is resumed after interruption through the flow-regulating valve.

It is also an object to provide an improvement in a flow-regulating valve as above mentioned for use in a hydraulic transmission containing a fluid pump and motor which will prevent motor jump when the motor is started after interruption.

It is a further object of this invention to provide an improved flow-regulating valve which will prevent motor jump when the motor is started after interruption, which may be economically manufactured, simple in operation, and which avoids the addition to the transmission of extra valves necessitating extra lines and fittings.

Further objects and advantages of the present invention will be apparent from the following description, reference being had to the accompanying drawings wherein a preferred form of the present invention is clearly shown.

In the drawings:

Figure 1 is a longitudinal sectional view of a preferred form of the present invention.

Figure 2 is a simplified diagrammatic view of a hydraulic power transmission showing one method of connecting the present invention in the transmission.

Figure 3:
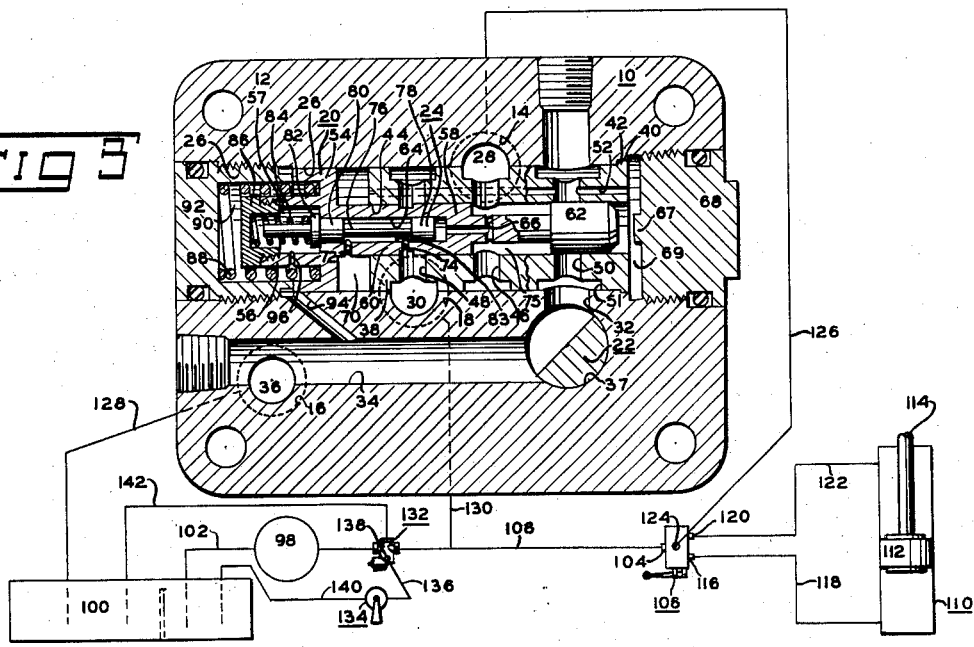
Figure 3 is a diagrammatic view of a hydraulic power transmission system incorporating a preferred form of the present invention and showing the parts in one position during operation.

Referring now to Figure 1 there is shown a flow-regulating valve 10 comprised of a body 12 having an inlet port 14, an outlet port 16 and a pressure port 18 and containing a compensating valve 20, an adjustable throttle 22 and a pilot valve 24. The ports 14, 16 and 18 are preferably located at the back surface of the body 12 and arranged for connection to the circuit lines by suitable "panel mounting" connections, such, for example, as are described in the Martin Patent No. 2,204,507. The body 12 has a main longitudinal stepped bore 26 in communication with inlet port 14 by means of an inlet passage 28 and with pressure port 18 by means of a pressure passage 30. A passage 32 connects bore 26 with throttle 22, and a passage 34 connects throttle 22 with an outlet passage 36 which is in communication with outlet port 16. Throttle 22 is rotatably mounted in a bore 37 which intersects passages 32 and 34, being interposed so as to serve as an adjustable restriction to flow from passage 32 to passage 34.

Tightly inserted in bore 26 is a sleeve 38 positioned therein by a flange 40 of sleeve 38 abutting a shoulder 42 of bore 26. Sleeve 38 has a centrally-located longitudinal bore 44 which is in communication with inlet passage 28 by means of a passage 46, with pressure passage 30 by means of a passage 48, and with passage 32 by means of a passage 50 and a groove 51. Sleeve 38 also has a longitudinally-drilled passageway 52 extending from end to end which is in communication with sleeve passage 50 but not in communication with sleeve passages 46 and 48.

Compensating valve 20 is comprised of a piston 54 provided with a head 56 which is hollow to form a chamber 57. Connected to piston 54 is a stem 58 having a land 60 extending from the right side of piston 54 and a land 62 spaced apart from land 60 and extending to the extreme right end of stem 58. Piston 54 and stem 58 have a longitudinal stepped bore 64 communicating with chamber 57 and extending to a point between lands 60 and 62 where it forms a communication with a transverse passage 66 in stem 58. Compensating valve 20 is inserted in bore 26 of body 12 and bore 44 of sleeve 38 with the right end of land 62 abutting a nipple 67 of a plug 68 which is threaded into the right end of bore 26. This abutment forms a chamber 69 in bore 26 between sleeve 38 and plug 68 with which passage 52 of sleeve 38 is in communication so as to make the effective area on the right side of land 62 responsive to fluid pressure in chamber 69 and also serves the purpose of limiting rightward movement of compensating valve 20.

A chamber 70, formed in bore 26 between the right side of piston 54 and the left end of sleeve 38, is in communication with bore 64 of compensating valve 20 by means of a small drilled passage 72 in land 60 immediately to the right of piston 54. Bore 64 is also in communication with pressure passage 30 by means of another small passage 74 in land 62 spaced apart from passage 72. An inlet chamber 75 is formed in sleeve bore 44 between lands 60 and 62 of valve 20.

Pilot valve 24 is comprised of a spool 76 provided with a land 78 at the extreme right end and a land 80 having a flange 82 spaced apart from land 78. Pilot valve 24 is located in stepped bore 64 of compensating valve 20 with flange 82, which is larger than bore 64, abutting the left side of piston 54. A chamber 83 is formed in compensating valve bore 64 between lands 78 and 80 of pilot valve 24. Chamber 83 is always in communication with chamber 70 by means of passage 72. Pressure passage 30 may or may not be in communication with chamber 83 and consequently chamber 70, depending upon whether land 78 of valve 24 is positioned to open or close passage 74.

A spring 84 of predetermined resistance is placed over the left end of spool 76 in chamber 57 abutting the left side of flange 82. A hollow cap 86 threaded into the head 56 of piston 54 forms an abutment for the other end of spring 84, substantially encloses chamber 57, and also limits leftward movement of pilot valve 24.

A spring 88 of predetermined resistance is located in a chamber 90 formed in bore 26 between piston 54 and a hollow plug 92 threaded into the left end of bore 26. The opposite ends of spring 88 abut piston 54 and plug 92, respectively, so as to normally position compensating valve 20 in the open position shown, with land 62 permitting communication between inlet chamber 75 and passage 50.

A branch passage 94 of passage 34 forms a communication between passage 34 and chamber 90 so as to make compensating valve 20 responsive to the pressure drop across throttle 22. A restricted passage 96 in the head 56 of compensating valve 20 connects chamber 57 with chamber 90 providing a dashpot reaction when pilot valve 24 shifts to the left.

Referring now to Figure 2, there is shown diagrammatically a hydraulic transmission circuit incorporating valve 10. There is shown a pump 98 which may be driven by an electric motor, not shown, which is supplied with fluid from a tank 100 by means of a suction conduit 102 and which is connected to a pressure port 104 of a suitable four-way directional valve 106 by means of a pump delivery conduit 108. There is also shown a motor 110 having a piston 112 connected to which is a piston rod 114, the head end of said motor being connected to a cylinder port 116 of valve 106 by means of a conduit 118 and the rod end of said motor being connected to another cylinder port 120 of valve 106 by means of a conduit 122.

A tank port 124 of valve 106 is connected to the inlet port 14 of valve 10 by means of a return conduit 126. Outlet port 16 of valve 10 is connected to tank 100 by means of a conduit 128. A branch conduit 130 connects pump delivery conduit 108 to the pressure port 18 of valve 10. Inlet port 14, outlet port 16 and pressure port 18 of valve 10 are shown in Figures 1, 3 and 4.

A suitable relief valve 132 is incorporated in the pump delivery conduit 108 and is preferably constructed in accordance with the disclosure of the patent to Harry F. Vickers, No. 2,043,453. Valves of this character may be provided with a venting port for venting the control chamber in order to permit the main valve to act as an unloading valve and bypass the pump delivery at negligible pressure.

A suitable, manually-controlled, two-way control valve 134 is connected by means of a conduit 136 to a venting port 138 of valve 132 and to tank 100 by means of a conduit 140. In one position control valve 134 will close venting port 138 and permit fluid from pump 98 to flow to directional valve 106 which will direct it to motor 110 in order to start said motor, while in another position control valve 134 will open venting port 138 to tank 100 by means of conduits 136 and 140, permitting valve 132 to open completely and unload pump 98 to tank 100 by means of an exhaust conduit 142 which connects valve 132 to tank 100, thus stopping motor 110. Relief valve 132 also serves as a safety factor in limiting the maximum pressure able to be developed in the system and in addition cooperates with valve 10 in exhausting to tank 100 an amount of fluid from pump 98 in excess of which throttle 22 has been adjusted to pass.

Figure 4:
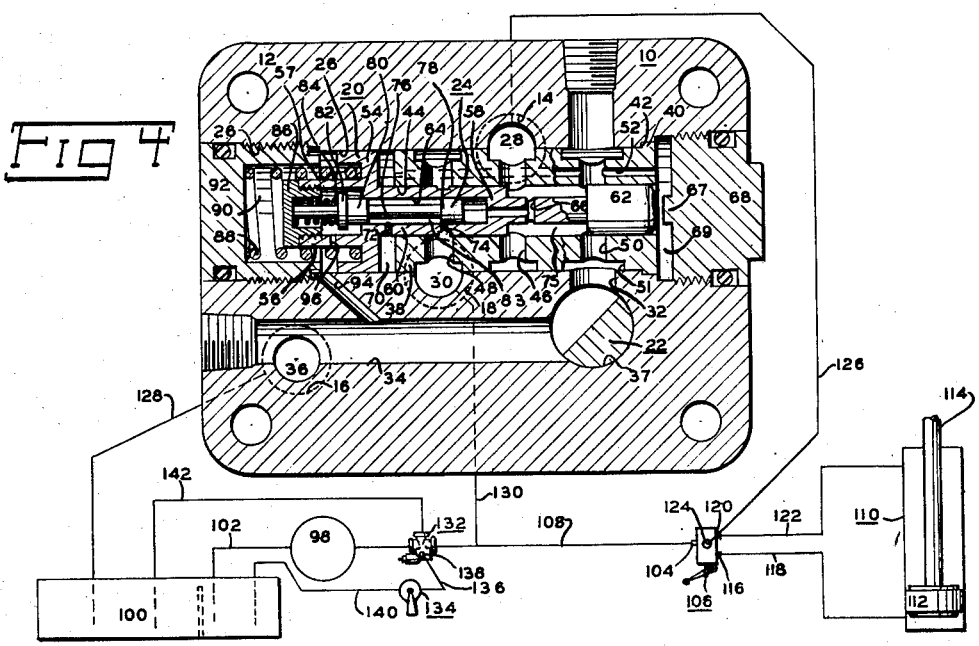
Figure 4 is a diagrammatic view of the same hydraulic power transmission system shown in Figure 3 but showing the parts in another position during operation.

Referring now to Figures 1 and 3, in operation with the electric motor running and operating pump 98 and with motor 110 stopped by reason of valve 134 being shifted to the position in which venting port 138 of valve 132 is vented to tank 100 and the full delivery of pump 98 being delivered to tank 100 by means of conduit 142, if valve 134 is shifted to close venting port 138 and directional valve 106 shifted to direct fluid to the head end of motor 110, conduit 108 is connected to conduit 118 and conduit 122 to conduit 126. At this stage of the operation, valve 10 will be in the position shown in Figure 1. Fluid under pressure from pump 98 is delivered by means of conduit 108 to the pressure port 104 of directional valve 106 and by means of port 116 and conduit 118 to the head end of motor 110. Pressure fluid from pump 98 is also delivered to the pressure port 18 of flow-regulating valve 10 by means of branch conduit 130. Pressure fluid entering pressure port 18 of valve 10 enters pressure passage 30, passage 48, passage 74, chamber 83, and to chamber 70 by means of passage 72 where pressure fluid acting on the right side of piston 54 shifts valve 20 to the left. Fluid in chamber 90 on the left side of piston 54 may discharge freely by means of passage 94, passage 34, outlet passage 36, outlet port 16 and conduit 128 to tank 100.

Shifting of compensating valve 20 to the left by pressure fluid from pump 98 causes land 62 of valve 20 to block passage 50 so that any fluid discharged from motor 110 entering inlet port 14, inlet passage 28, passage 46 and inlet chamber 75 is blocked from communication with throttle 22.

Referring now to Figure 4, pressure transmitted from the head end to the rod end of motor 110 entering inlet chamber 75 enters passage 66 and bore 64 of compensating valve 20 and acts on the right end of land 78 of pilot valve 24, shifting valve 24 to the left. Fluid in chamber 57 being forced out by land 80 of pilot valve 24 must leave by restricted passage 96 in the head 56 of piston 54. This provides a dashpot action which prevents an excessive discharge of fluid from motor 110. Consequently the movement of piston 112 of motor 110 will be restricted by the dashpot action. When pilot valve 24 has shifted to the left sufficiently to permit land 78 to block passage 74, communication between compensating valve 20 and fluid pressure from pump 98 is blocked. With compensating valve 20 in the position shown in Figure 3, it is almost ready to operate in the well-known manner to maintain a constant flow across throttle 22.

Pressure fluid in chamber 70 may escape by passage 52 to passage 50, and, although the latter is blocked from communication with passage 32 by land 62 of valve 20, fluid in passage 50 may escape by groove 51 to passage 32 and to tank 100 by means of throttle 22, passage 34, outlet passage 36, port 16 and conduit 128.

As shown in Figure 4, discharging fluid from motor 110 keeps pilot valve 24 in the closed position, and the escape of fluid from chamber 70 has permitted compensating valve 20 to open partially and permit discharging fluid from motor 110 to flow across throttle 22 by means of inlet port 14, inlet passage 28, inlet chamber 75, passage 50, groove 51 and passage 32, and thence to tank 100 by means of passage 34, outlet passage 36, port 16 and conduit 128. At the same time, fluid pressure entering passage 50 enters passage 52 and chamber 70 where it may act on the right side of piston 54, and fluid in passage 50 also enters chamber 69 by means of passage 52 where it acts against the right end of land 62. Whatever the fluid pressure is beyond throttle 22 in passage 34 is also present in chamber 90 where it may act on the left side of piston 54 and the head 56.

The purpose of compensating valve 20 is to maintain a constant regulated flow across throttle 22. If the pressure drop across throttle 22 is maintained constant, the flow across throttle 22 will be constant. Compensating valve 20 is responsive to the pressure drop across throttle 22, and, if at any time the pressure in passage 50 builds up due to the restriction of throttle 22, this increase in pressure also takes place in chamber 70 because of restricted passage 52 forming a means of communication between passage 50 and chamber 70. This pressure increase in chamber 70 which acts on piston 54 causes compensating valve 20 to shift to the left. Compensating valve 20 shifts only far enough so that land 62 will permit a flow of fluid from inlet chamber 75 to passage 50 in sufficient volume to maintain a predetermined pressure in passage 50. This pressure in passage 50 is determined by the resistance of spring 88. Whatever the pressure existent in conduit 128 is also existent in passage 84 and is communicated to chamber 90 and the left side of piston 54 by means of passage 94. Thus, by maintaining a constant pressure in passage 50, which pressure is determined by the resistance of spring 88, the flow across throttle 22 will be uniformly constant and the speed of motor 110 will be constant.

If for any reason the flow of fluid to motor 110 ceases, pilot valve 24 would shift to the right by action of spring 84, and spring 88 would open compensating valve 20. When flow from pump 98 to motor 110 is resumed, fluid pressure from pump 98 would again close compensating valve 20, and discharged fluid from motor 110 would have to shift pilot valve 24 before compensating valve 20 would be able to operate in the normal manner.

If, upon completion of movement of piston 112 of motor 110, piston 112 is moved in the opposite direction by shifting valve 106 to connect conduits 108 and 122 and conduits 118 and 126, the same operation is performed. Fluid pressure from pump 98 will close compensating valve 20, and exhaust fluid from the head end of motor 110 must shift pilot valve 24 before compensating valve 20 may operate in a normal manner.

If during a feeding movement the resistance which piston 112 encounters should become too high, the fluid pressure in the motor outlet line 122 will drop below the value of spring 84, and pilot valve 24 will shift to the right. This will cause compensating valve 20 to close as previously described and immediately stop the fluid motor, causing all of the pump delivery to spill over the relief valve 132. Preferably the setting of spring 84 is such as to respond at a relatively low pressure compared to the pressure setting of relief valve 132.

When fluid flow to motor 110 resumes after interruption, pilot valve 24 will not in any manner interfere with the normal operation of compensating valve 20 after compensating valve 20 assumes normal regulating position.

If it were not for fluid pressure from pump 98 closing compensating valve 20 when flow was resumed after interruption, compensating valve 20 would be in the completely open position momentarily and permit more fluid to pass through than it would ordinarily allow to pass if it were in regulating position. Before land 62 could shift to partially close communication between inlet chamber 75 and passage 50, an excessive amount of fluid discharged from motor 110 would cause piston 112 to move at a faster speed for a short distance than the speed at which flow-regulating valve 10 should permit piston 112 to move. If motor 110, for instance, was connected to operate a machine cutting tool, the result would be disastrous to the cutting tool.

It should be noted that the present invention overcomes this temporary lapse of the compensating valve by making it impossible for an amount of fluid above the normal regulated amount to pass through the compensating valve when flow is resumed after interruption.

It should also be noted that compensating valve 20 when in a normal regulating position is never wholly open or wholly closed. Its position fluctuates so as to permit just enough fluid to enter inlet chamber 75 and to flow through passage 50 which will be sufficient to maintain a constant pressure in passage 50 so as to maintain constant the flow across throttle 22. Whenever flow to the flow regulating valve is interrupted, compensating valve 20 opens completely. When flow is resumed, if the compensating valve remained in this completely open position, a temporary flow of fluid above the normal regulated rate which flow-regulating valve 10 is originally adjusted to pass would flow through the flow-regulating valve before compensating valve 20 could assume normal regulating position. By momentarily closing the compensating valve when the motor is started after interruption of movement and gradually opening the compensating valve up to normal regulating position, a flow of fluid above normal regulated rate through the flow-regulating valve is prevented. By preventing a temporary flow of fluid above normal regulated rate through the flow-regulating valve when the motor is started after interruption, the motor is prevented from jumping, i. e., moving a short distance faster than normal regulated speed of the motor.

While the form of embodiment of the invention as herein disclosed constitutes a preferred form, it is to be understood that other forms might be adopted, all coming within the scope of the claims which follow.

What is claimed is as follows:

1. A flow regulating valve for controlling the flow of fluid in a hydraulic power circuit comprising in combination a flow passage having an inlet and an outlet, an adjustable throttle and a pressure compensating valve in series in said passage, means for operating the compensating valve subjected to pressures in the passage ahead of and beyond the throttle for causing the compensating valve to assume various regulating positions for maintaining the pressure drop across the throttle constant and including means biasing the compensating valve to the fully open position when flow to the inlet of the passage ceases, and a pressure responsive pilot valve hydraulically connected to the operating means and adapted to be connected to an external source of pressure fluid for closing the compensating valve, said pilot valve being responsive to increases of pressure at the inlet of the flow passage when fluid flow is resumed to the inlet of the passage after interruption for closing communication between the external source and the operating means and permitting the operating means to cause the compensating valve to assume a regulating position from the fully closed position.

2. A flow regulating valve for controlling the flow of fluid in a hydraulic power circuit comprising in combination a flow passage having an inlet and an outlet, an adjustable throttle and a pressure compensating valve in series in said passage, piston means for operating the compensating valve and responsive to the pressure drop across the throttle for causing the compensating valve to assume various regulating positions for maintaining the pressure drop across the throttle constant and including means biasing the compensating valve to the fully open position when flow to the inlet of the passage ceases, and a pressure responsive pilot valve hydraulically connected to the operating means and adapted to be connected to an external source of pressure fluid for closing the compensating valve, said pilot valve being responsive to increases of pressure at the inlet of the flow passage when fluid flow is resumed to the inlet of the passage after interruption for closing communication between the external source and the operating means and permitting the operating means to cause the compensating valve to assume a regulating position from the fully closed position.

3. A flow regulating valve for controlling the flow of fluid in a hydraulic circuit and comprising in combination a first passage through which fluid is adapted to flow at a regulated rate, in series in said passage an adjustable throttle and a pressure compensating valve, means for operating the compensating valve responsive to the pressure drop across the throttle for causing the compensating valve to assume numerous regulating positions and maintain the pressure drop across the throttle constant and including means biasing the compensating valve to the fully open position when flow to the passage is interrupted, a second passage connected to the operating means ahead of the throttle and adapted to be connected to an external source of pressure, and pressure responsive valve means for controlling the second passage, said valve means being biased to a position opening the second passage for directing pressure to the operating means for closing the compensating valve and being responsive to pressure increases in the first passage when fluid flow is resumed to the first passage after interruption for closing communication between the operating means and the external source of pressure thereby permitting the operating means to cause the compensating valve to assume a regulating position from the fully closed position.

4. In a hydraulic power transmission system containing a fluid pump and motor, a flow regulating valve for controlling the speed of the motor, said flow regulating valve comprising in combination a flow passage connected to the motor, in series in the passage an adjustable throttle through which fluid is adapted to flow at a regulated rate and a pressure compensating valve, means for operating the compensating valve responsive to the pressure drop across the throttle for causing the compensating valve to assume numerous regulating positions to maintain the pressure drop across the throttle constant and including resilient biasing means, said resilient means biasing the compensating valve to the fully open position when flow to the flow regulating valve is interrupted, and pressure responsive pilot valve means connected to a source of pressure fluid in the circuit and to the compensating valve operating means for directing pressure to the operating means for closing the compensating valve, said pilot valve being operatively connected to the operating means ahead of the throttle and being responsive to predetermined increases of pressure in the passage when fluid flow is resumed to the passage after interruption for closing communication between the source of pressure and the operating means and permitting the operating means to cause the compensating valve to assume a regulating position from the fully closed position.

5. In a hydraulic power transmission system containing a fluid pump and motor, a flow regulating valve for controlling the speed of the motor, said flow regulating valve comprising in combination a flow passage connected to the motor, in series in the passage an adjustable throttle through which fluid is adapted to flow at a regulated rate and a pressure compensating valve, piston means for operating the compensating valve responsive to the pressure drop across the throttle for causing the compensating valve to assume numerous regulating positions to maintain the pressure drop across the throttle constant and including resilient biasing means, said resilient means biasing the compensating valve to the fully open position when flow to the flow regulating valve is interrupted, a second passage connected to a source of pressure fluid in the circuit and to the piston operating means, and a pressure responsive pilot valve for controlling the second passage operatively connected to the flow passage ahead of the throttle, said pilot valve directing pressure fluid to the piston operating means closing the compensating valve and being responsive to increases of pressure in the flow passage when fluid flow is resumed thereto after interruption for closing the second passage and permitting the operating means to cause the compensating valve to assume a regulating position from the fully closed position.

6. In a hydraulic power transmission system having a fluid pump, a fluid motor and means for stopping the motor by interrupting fluid flow to the motor, a flow regulating valve for controlling the speed of the motor comprising in combination a flow passage connected to the motor, in series in the passage an adjustable throttle and a pressure compensating valve, piston means for operating the compensating valve responsive to the pressure drop across the throttle for causing the compensating valve to assume numerous regulating positions to maintain a constant pressure drop across the throttle and including resilient biasing means, said resilient means biasing the compensating valve to the fully open position when the motor is stopped and fluid flow to the flow regulating valve is interrupted, and a pressure responsive pilot valve hydraulically connected to a source of pressure in the system and to the piston operating means, and means biasing the pilot valve to a position connecting the source of pressure to the piston operating means for closing the compensating valve, said pilot valve being responsive to predetermined pressure increases in the flow passage ahead of the throttle when fluid flow is resumed to the motor after interruption for closing the pressure source from the piston operating means and permitting the piston operating means to cause the compensating valve to assume a regulating position from the fully closed position.

FERRIS T. HARRINGTON.

REFERENCES CITED

The following references are of record in the file of this patent:

UNITED STATES PATENTS

| Number | Name | Date |
|---|---|---|
| 1,985,443 | Clute | Dec. 25, 1934 |
| 2,166,940 | Conradson | July 25, 1939 |

FOREIGN PATENTS

| Number | Country | Date |
|---|---|---|
| 373,732 | Great Britain | June 2, 1932 |